US006870653B2

(12) United States Patent
Newman

(10) Patent No.: US 6,870,653 B2
(45) Date of Patent: Mar. 22, 2005

(54) DECOUPLED ALIGNMENT AXIS FOR FOLD MIRROR ADJUSTMENT

(75) Inventor: Peter A. Newman, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/742,317

(22) Filed: Dec. 19, 2003

(65) Prior Publication Data

US 2004/0150863 A1 Aug. 5, 2004

Related U.S. Application Data

(60) Provisional application No. 60/444,046, filed on Jan. 31, 2003.

(51) Int. Cl.⁷ .............................................. G02B 26/08
(52) U.S. Cl. ...................................... 359/212; 359/900
(58) Field of Search ................................. 359/196–226, 359/872, 876; 250/234–236; 347/234, 248, 250, 256–261

(56) References Cited

U.S. PATENT DOCUMENTS 5,506,719 A * 4/1996 Murakami et al. .......... 359/216

* cited by examiner

Primary Examiner—James Phan
(74) Attorney, Agent, or Firm—Susan L. Parulski

(57) ABSTRACT

A method of laser beam alignment in a laser scanning system comprising: providing an elongated planar mirror having left and right ends for directing a laser beam scan line to a scan line imaging region spaced from the mirror; detecting left and right spots of the laser beam scan line to determine whether the laser beam is aligned in the imaging region, and if it is not; first rotating the elongated mirror about a first axis extending along the scan line direction of the mirror until the right spot is detected; second rotating the mirror about a second axis located near the right end of the mirror, the second axis extending in the plane of the mirror at angle to the first axis until the left spot is detected.

3 Claims, 7 Drawing Sheets

DECOUPLED ALIGNMENT AXIS FOR FOLD MIRROR ADJUSTMENT

CROSS-REFERENCE TO RELATED APPLICATIONS

This is a 111A application of Provisional Application Ser. No. 60/444,046, filed Jan. 31, 2003.

FIELD OF THE INVENTION

This invention relates in general to optical imaging systems and more particularly to the alignment of optical components in a computed radiography laser scanning system.

BACKGROUND OF THE INVENTION

In a Computed Radiography (CR) system, the laser beam is scanned over the surface of a storage phosphor screen by a galvanometer in the fast scan direction while the screen is transported under the scanline in the slow scan direction. To make the CR reader compact and manufacturable, a final fold mirror is placed in the optical path between the F-theta lens and the phosphor screen. The fold mirror introduces three degrees of freedom into the optical system. A coordinate system on the mirror has an x-axis along the fast scan dimension of the mirror, a y-axis in the plane of the mirror perpendicular to the x-axis and a z-axis normal to the mirror surface.

The z-axis degree of freedom allows the path length of the optical system to be adjusted by translating the mirror along that axis. Typically, the depth of focus of the laser is not critical and there is no need to adjust this degree of freedom.

The other two degrees of freedom are rotations about the x and y axes which allow the scanline to be positioned on the phosphor surface. It is required to rotate the scanline perpendicular to the slow scan transport direction to eliminate a parallelogram image distortion. It is also required to translate the scanline to a particular position where the laser beam is not obstructed and the phosphor screen is well controlled for height. Adjusting the scanline to the correct angle and position is practically achieved by having a sensor at each end of the scanline. These sensors are implemented behind slits along the scanline. When the scanline hits these sensors the correct angle and position is achieved.

The final fold mirror adjustment mechanism in prior CR readers used two orthogonal rotation axes. The first axis was always along the x-axis of the mirror, which provided the translation of the scanline. The second axis was perpendicular to the first axis, sometimes oriented vertically, which provided rotation of the scanline. However this axis had the problem of also translating the scanline. This coupling of the two adjustments means that an iterative adjustment process is needed.

The first axis is adjusted until sensor 1 turns on. Then a search is made using the first axis to determine whether the scanline is ahead of or behind sensor 2. The first axis is readjusted to turn sensor 1 on and the knowledge gained during the search is used to turn axis 2 in the appropriate direction to correct the scanline rotation error. However as the adjustment is made with axis 2, sensor 1 will turn off because axis 2 translates as well as rotates the scanline. It is not easy to determine that the correct rotation has been achieved. Axis 1 is adjusted again to turn on sensor 1, and sensor 2 is observed. It may or may not be on. This back and forth between the two axes is continued until both sensors are turned on simultaneously. Thus a time-consuming iterative process is used to adjust the final fold mirror.

SUMMARY OF THE INVENTION

According to the present invention there is provided a solution to these problems.

According to a feature of the present invention there is provided a method of laser beam alignment in a laser scanning system comprising:

providing an elongated planar mirror having left and right ends for directing a laser beam scan line to a scan line imaging region spaced from said mirror;

detecting left and right spots of said laser beam scan line to determine whether said laser beam is aligned in said imaging region, and if it is not;

first rotating said elongated mirror about a first axis extending along the scan line direction of said mirror until said right spot is detected;

second rotating said mirror about a second axis located near the right end of said mirror, said second axis extending in the plane of said mirror at angle to said first axis until said left spot is detected.

ADVANTAGEOUS EFFECT OF THE INVENTION

The invention has the following advantages.

1. A simple, quick, non-iterative process is used to adjust the final fold mirror in a laser scanning optical system.

DETAILED DESCRIPTION OF THE INVENTION

Figure 1:
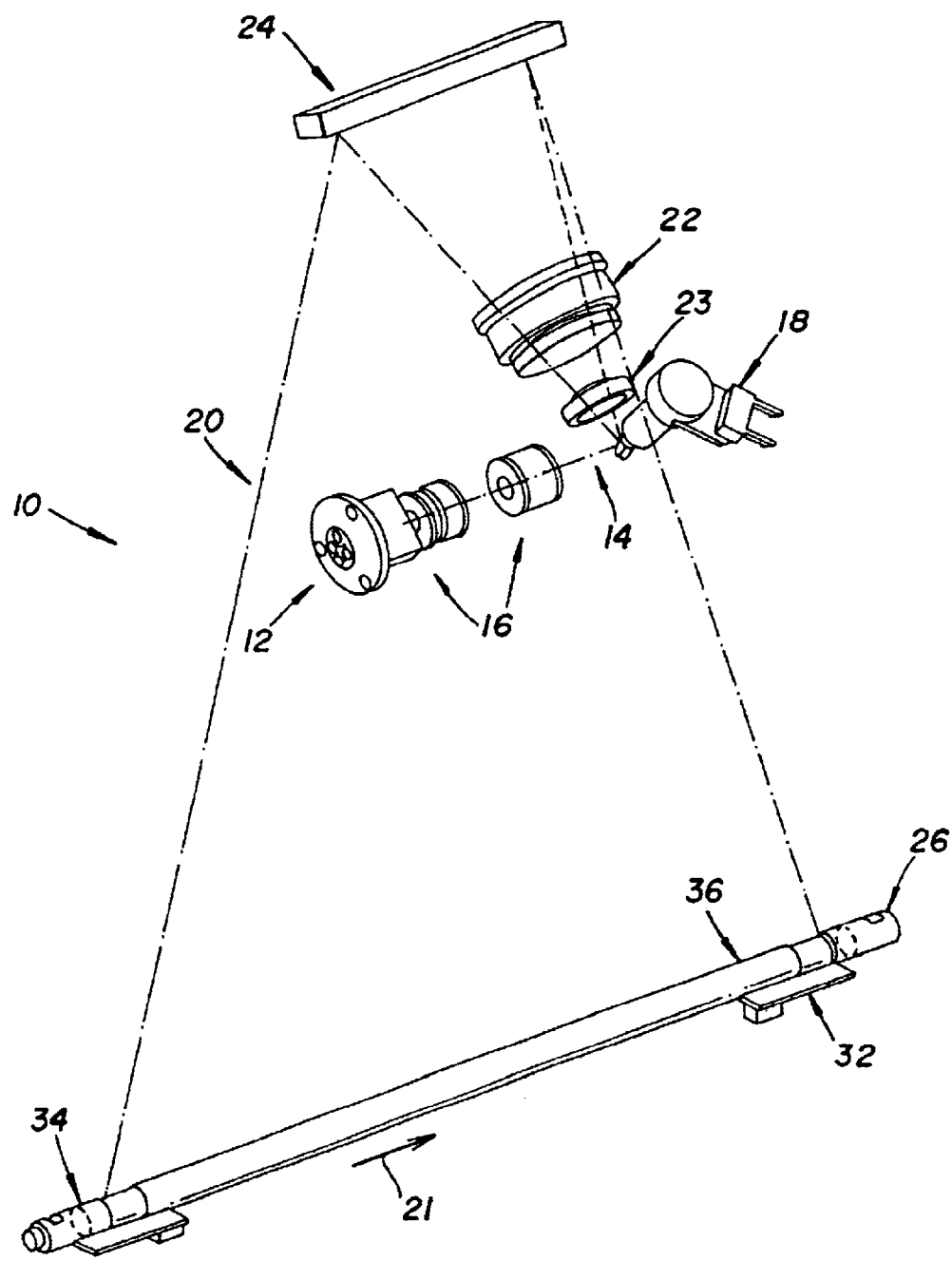
FIG. 1 is a diagrammatic view which shows all the overall layout of the CR optical system with the principle components.
Figure 2:
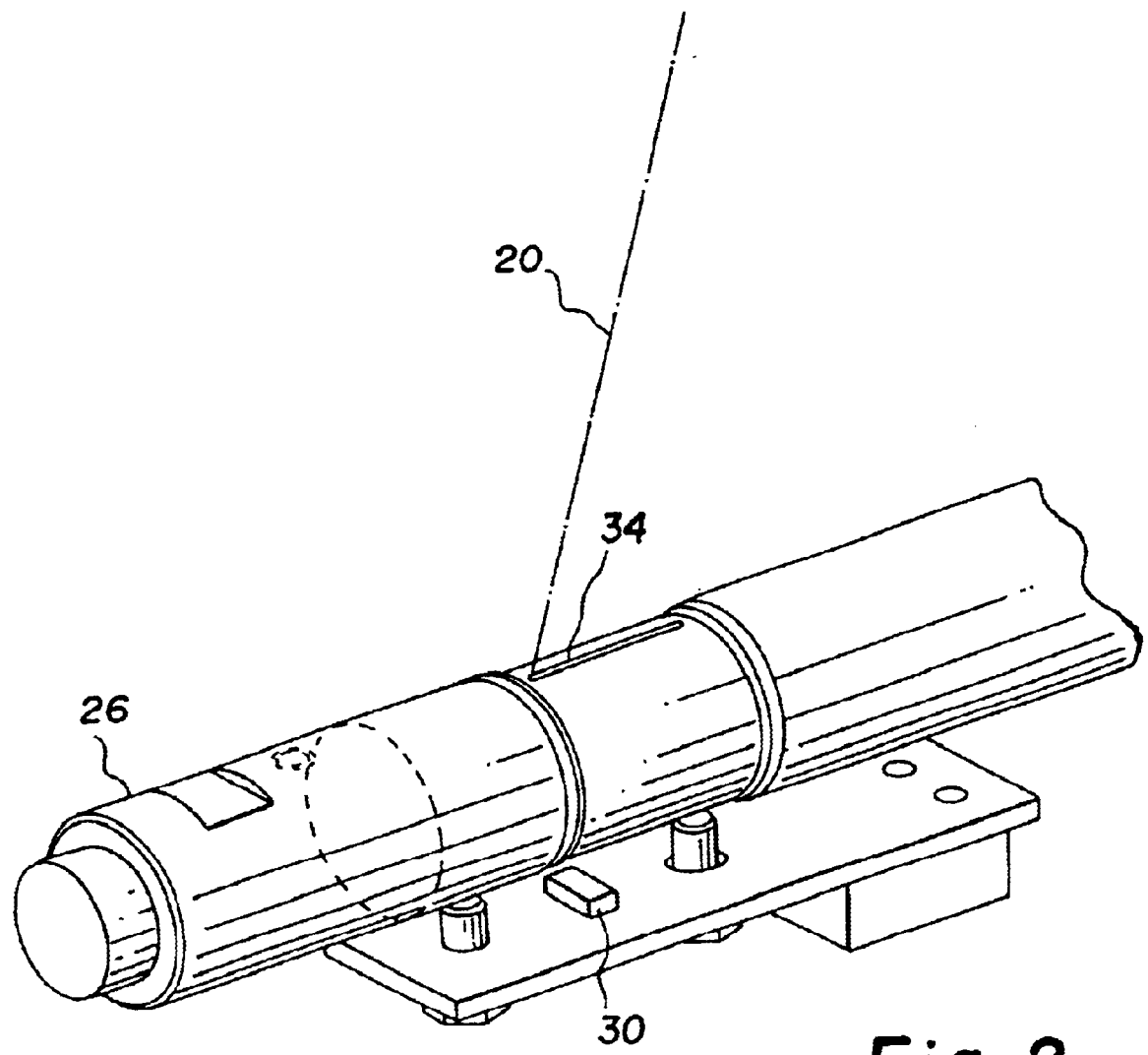
FIG. 2 is a diagrammatic view which shows the sensor slit of FIG. 1.
Figure 3:
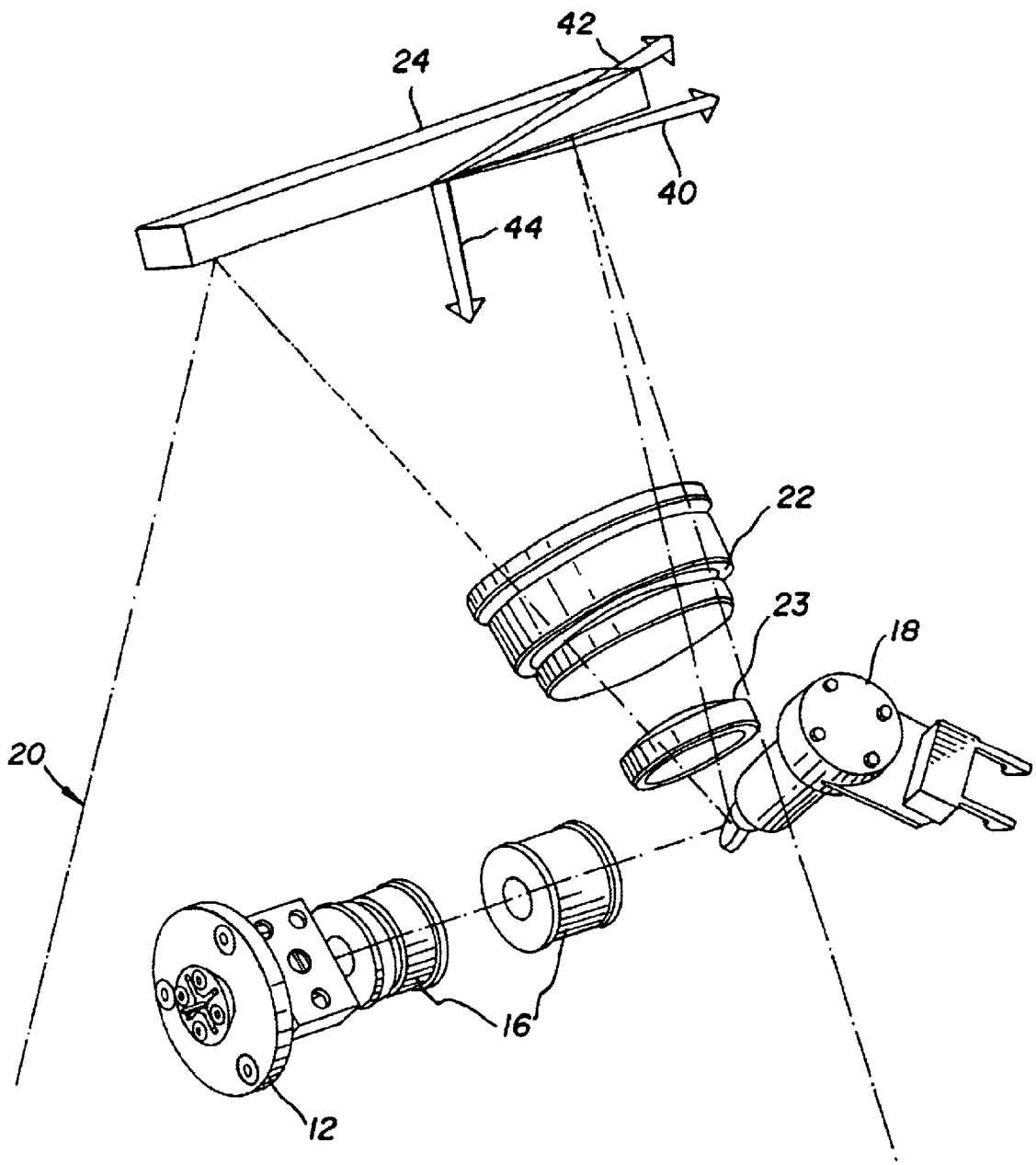
FIG. 3 is a diagrammatic view which shows the coordinate system on the mirror of FIG. 1.

Referring now to FIGS. 1–3, there is shown a laser scanning optical system for use in a computed radiography scanning system (or any other similar scanning system) incorporating an embodiment of the present invention. As shown, laser scanning optical system 10 includes a laser diode 12 which produces a laser beam 14 shaped by shaper lens elements 16. A reciprocating galvonometer mirror 18 produces a laser beam scan line 20 in a fast scan direction 21 shaped by F-theta lens 22 and lens 23. A final fold mirror 24 directs scan line 20 onto platen 26. Platen 26 establishes an imaging region for a storage phosphor plate transported in a slow scan direction 28 over platen 26. Sensors 30 and 32 are located at the ends of scan line 20 and are activated by laser beam 14 passing through respective slits 34 and 36 in platen 26. A rotating multifaceted polygon mirror can also be used in place of the reciprocating galvonometer mirror 18 to produce laser beam scan line 20.

FIG. 3 illustrates the three axes along which mirror 24 can be adjusted to properly align the scan line 20 on platen 26. These axes are x-axis 40, y-axis 42, z-axis 44. X-axis 40 is along the fast scan dimension of mirror 24, y-axis 42 is in the plane of the mirror perpendicular to the x-axis 40, and z-axis 44 is normal to the surface of mirror 24 which allows the path length of the optical system to be adjusted by translating mirror 24 along it. Adjustment of mirror 24 along axis 40 and 42 allow the scan line 20 to be positioned on platen 26 and a storage phosphor plate moved over platen 26.

According to the present invention the solution is to find a second axis that decouples the rotation of the scan line across sensor 30 from the translation of the scan line at sensor 32. The first axis is used to turn on sensor 32, and a special second axis that rotates the scan line about sensor 32, which allows sensor 30 to turn on without sensor 32 turning off. Thus, a simple, quick, non-iterative process is used to adjust the final fold mirror. This special axis is not obvious to those trained in the art because it is not orthogonal to the first axis.

One characteristic of this special second axis is that the ends of the scan line translate slightly parallel to the scan line as it is adjusted. This is not a problem because when the reader is calibrated, the sweep of the galvanometer is automatically adjusted to the edges of the phosphor screen. As the scan line translates parallel to itself at sensor 32 while the second axis is being adjusted, a path length difference is introduced between the ray traveling to sensor 32 and the ray traveling to sensor 30. This uses up some of the depth of focus in the system.

There are an infinite number of the special second axes to choose from. As a refinement of the invention, there is an optimum axis, which has the added desirable property of minimizing the path length difference, and maintaining most of the depth of focus for other uses like looser tolerances on other components.

This optimum axis is found by building a mathematical model of the fold mirror and the sensor slits. A set of equations is written to calculate the path length for three rays. Ray 1 to sensor 32, ray 2 to sensor 30, and ray 3, the axial ray. A constraint equation is placed on the axial ray keeping it constant in length. The nominal geometry is all three rays are on target. The equations are written in terms of the six degrees of freedom of the position of the mirror in space. A constraint equation is written to keep ray 1 from moving off the sensor 32 slit 36 while allowing ray 1 to move along the slit 36. A constraint equation is placed on ray 2 to drive it a small distance off the sensor 30 slit 34. A numerical optimizer iterates on the six degrees of freedom of the mirror position until all the equations are satisfied while minimizing the path length difference between the rays to sensor 1 and sensor 2.

The intersection of the nominal mirror plane and the mirror plane of the solution defines the second special axis.

These equations and their optimization are easily done by a optical engineer skilled in the use of lens design software. The mechanical design of the parts that implement this axis is easily done by a mechanical designer.

Figure 4:
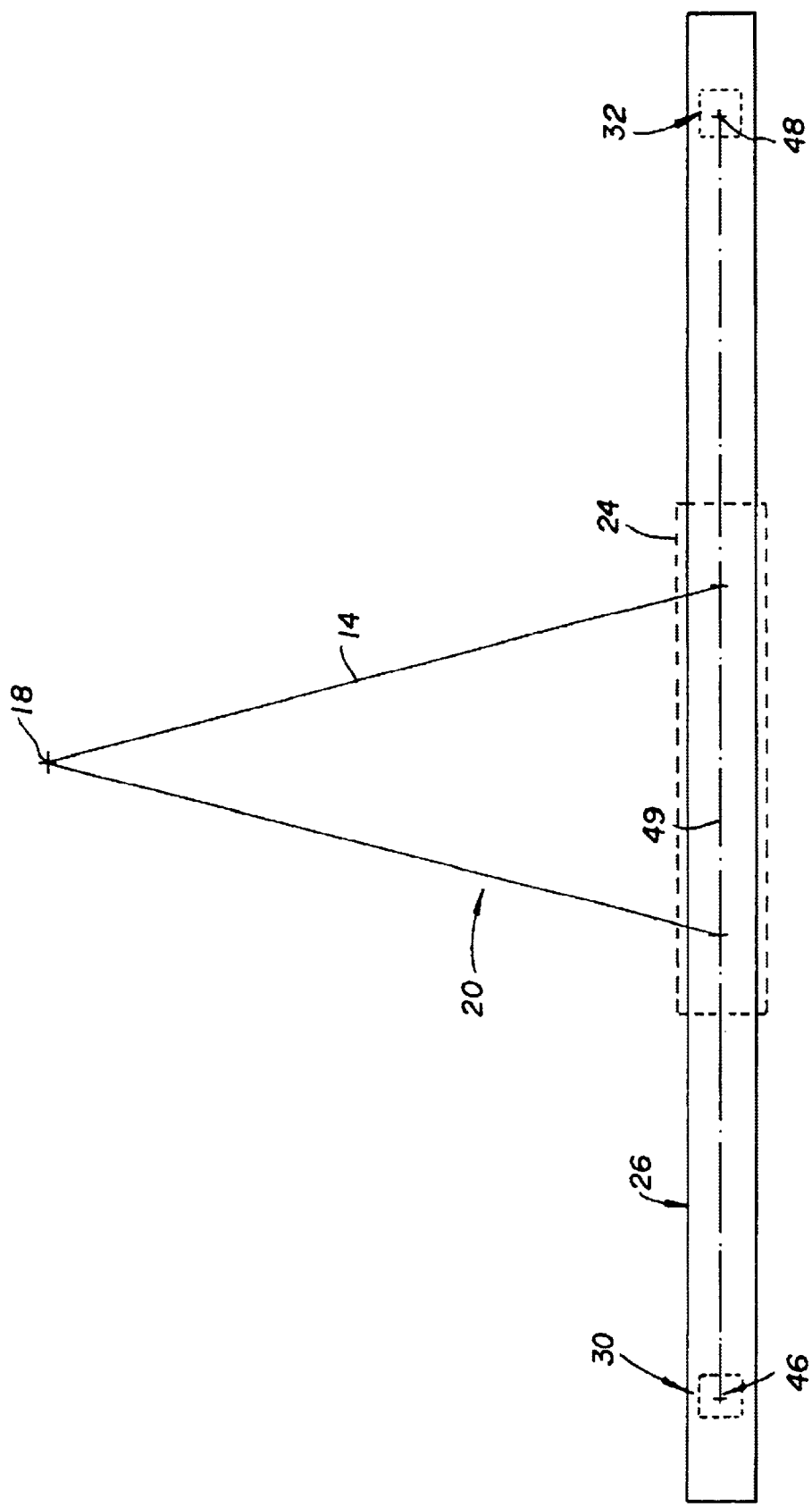
FIG. 4 is a diagrammatic view which shows the final adjusted position of the scan line.

Referring more particularly to FIGS. 4–7, there will be illustrated the present invention. FIG. 4 shows the alignment of mirror 24 has been completed. As shown the laser beam scan line 20 falls on platen 24 such that sensors 30 and 32 are activated at the ends of the scan line 20. The reciprocating galvanometer mirror 18 sweeps laser beam 14 to the left and right ends of a storage phosphor plate positioned on platen 24. In order to effect the complete alignment of FIG. 4, the laser beam 14 has to pass through the narrow slots 34 and 36 at the left and right of platen 26 to sensors 30 and 32 located below platen 26. After initial assembly of the optical system 10, the laser spots 46 and 48 at each end of the platen 26 will not be on the scan centerline 49 as shown in FIG. 4. Two adjustments of mirror 26 will now be described to put them there.

Figure 5:
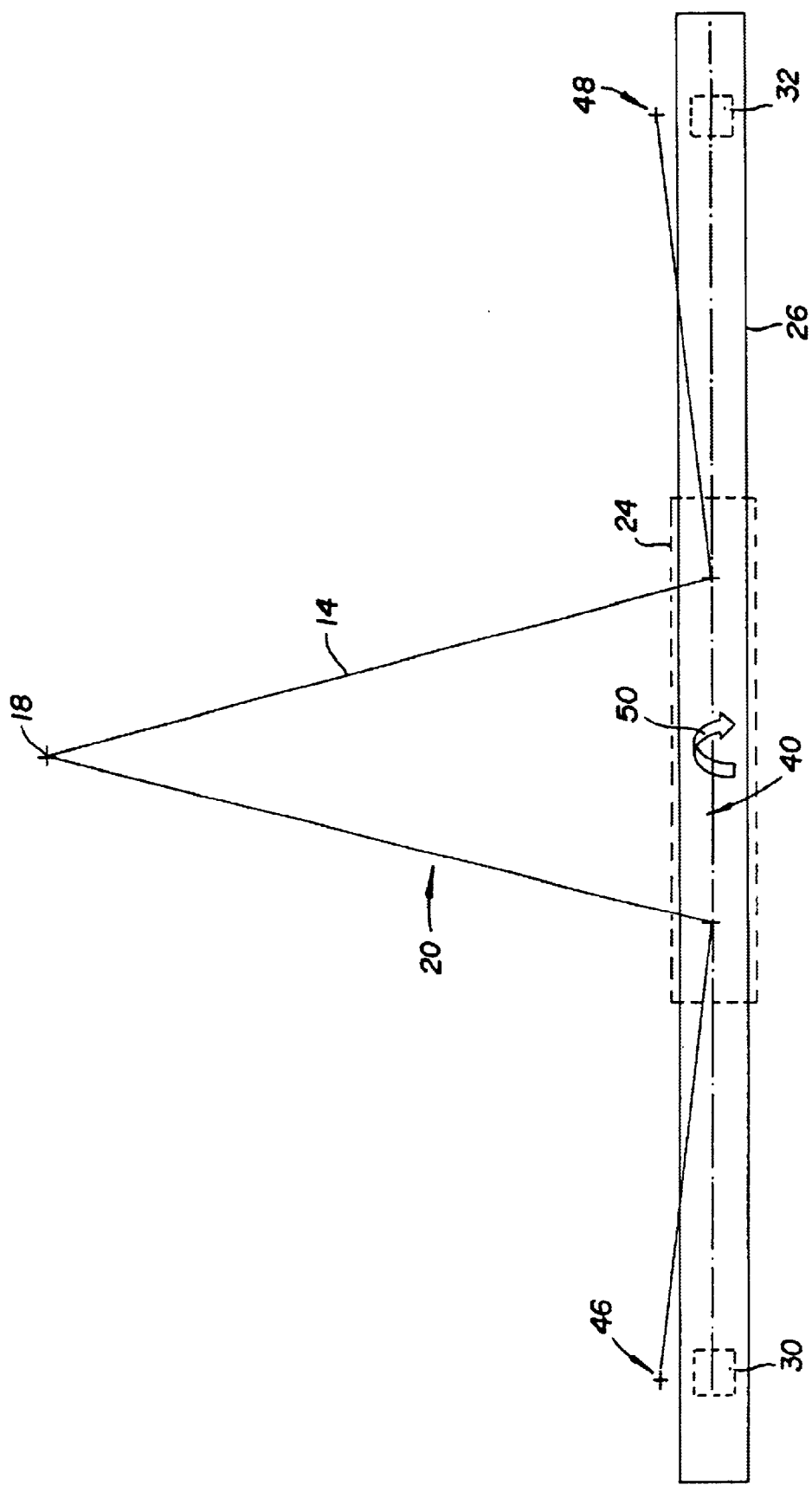
FIG. 5 is a diagrammatic view which shows the effect of the first axis adjustment.

As shown in FIG. 5, the first adjustment is rotation (arrow 50) of mirror 24 about the x-axis 40 which has the effect of moving both end laser spots 46 and 48 in the slow scan direction 28 (FIG. 1). By looking at only the output of sensor 32, the right spot 48 is put on target (activating sensor 32) by adjusting the angle about the axis 40.

Figure 6:
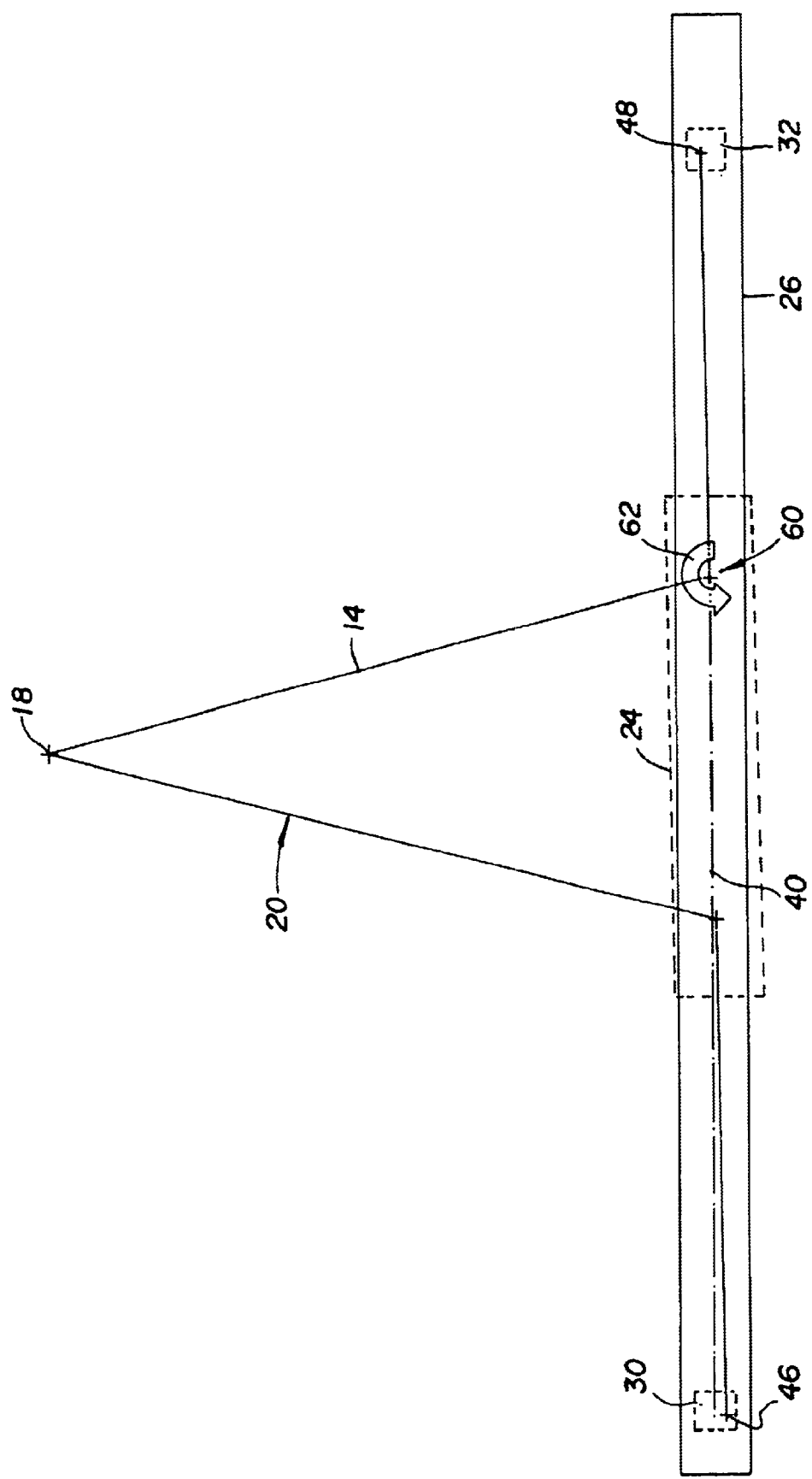
FIG. 6 is a diagrammatic view which shows a known technique where the second axis adjustment rotates and translates the scan line.

FIG. 6 shows the known second axis adjustment involving rotation of mirror 24 about z-axis 44 located at point 60 near the right end of mirror 24 which has the effect of moving the left spot 46 in the slow scan direction 28 while looking at the output of the left sensor 30. The rotation 62 axis is perpendicular to point 60.

Unfortunately, the result moves the right spot 48 which was on target on sensor 32, off sensor 32. In other words, these two adjustments are coupled and not independent. This makes for a tedious iterative adjustment process between these two adjustments. Moreover, the second adjustment also causes the laser spots 46 and 48 to shift along the length of platen 26 but this can be compensated for by adjusting the angle of galvonometer mirror 18.

Figure 7:
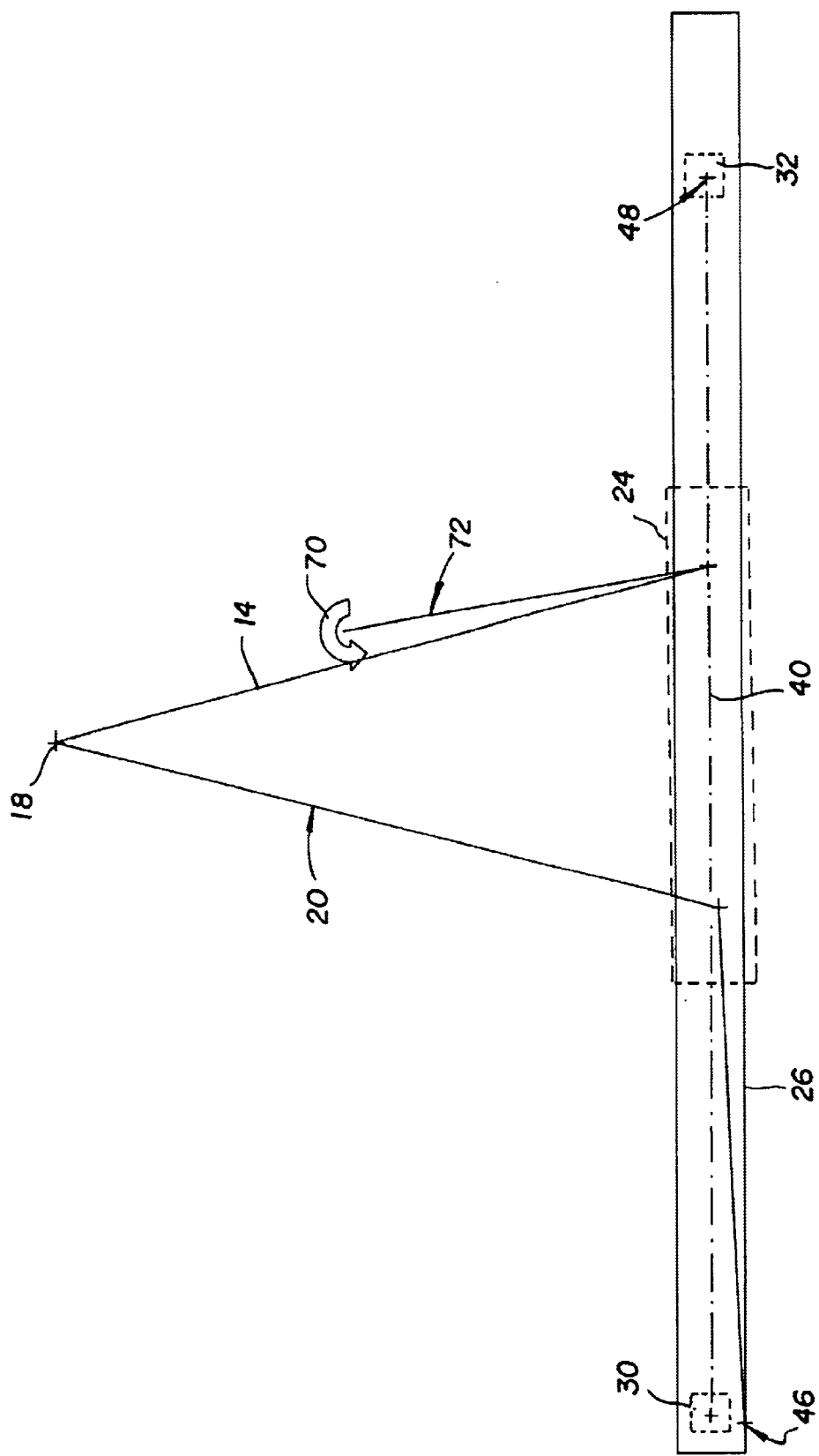
FIG. 7 is a diagrammatic view which shows the invention where the second axis adjustment translates one end of the scan line only.

According to the invention, as illustrated in FIG. 7, these problems are eliminated by decoupling the second axis adjustment of mirror 24. If the second adjustment is about a special axis of rotation 70 about an axis 72 located near the right end of mirror 24, the left laser spot 46 can be moved in the slow scan direction 28 while looking at the output of the left sensor 30. Axis 72 is in the plane of mirror 26 at an angle to axis 40. This axis 72 is special because the right spot 48 which was on target on right sensor 32 after the first axis adjustment, does not move in the slow scan direction 28, adjustments 1 and 2 being uncoupled and independent of one another. This makes for a simple adjustment process using the two adjustments once each. Note that although the second adjustment also causes the laser sports 46 and 46 to shift along the length of platen 26, this is compensated for during calibration of the CR reader the optical system 10 is used in. Axis 72 can be determined by the process discussed above.

The invention has been described in detail with particular reference to certain preferred embodiments thereof, but it will be understood that variations and modifications can be effected within the spirit and scope of the invention.

Parts List 10 laser scanning optical system
12 laser diode
14 laser beam
16 shaper lens element
18 galvonometer mirror
20 laser beam scan line
21 fast scan direction
22 F-theta lens
23 lens
24 final fold mirror
26 platen
28 slow scan direction
30 sensor
32 sensor 34 slit
36 slit
40 x-axis
42 y-axis
44 z-axis
46 laser spot
48 laser spot
50 rotation arrow
60 point
62 axis
70 rotation
72 axis

What is claimed is:

1. A method of laser beam alignment in a laser scanning system comprising:

providing an elongated planar mirror having left and right ends for directing a laser beam scan line to a scan line imaging region spaced from said mirror;

detecting left and right spots of said laser beam scan line to determine whether said laser beam is aligned in said imaging region, and if it is not then, first rotating said elongated mirror about a first axis extending along the scan line direction of said mirror until said right spot is detected; and second rotating said mirror about a second axis located near the right end of said mirror, said second axis extending in the plane of said mirror at angle to said first axis until said left spot is detected.

2. The method of claim 1 wherein said provided elongated planar mirror is rectangular in shape.

3. The method of claim 1 wherein said right and left spots are detected by photosensors.

* * * * *